United States Patent [19]

Lewis

[11] 4,194,244
[45] Mar. 18, 1980

[54] ANGLE SENSING SYSTEM

[75] Inventor: Bernard L. Lewis, Oxon Hill, Md.

[73] Assignee: The United States of America as represented by the Secretary of the Navy, Washington, D.C.

[21] Appl. No.: 934,662

[22] Filed: Aug. 17, 1978

[51] Int. Cl.² .......................... G01S 3/36; G01P 13/02
[52] U.S. Cl. ...................................... 364/428; 340/26; 343/113 R; 364/559
[58] Field of Search ................ 364/428, 559; 343/113, 343/107; 340/26; 244/184

[56] References Cited

U.S. PATENT DOCUMENTS

| | | | |
|---|---|---|---|
| 3,355,736 | 11/1967 | Perper | 364/559 |
| 3,490,024 | 1/1970 | Sherrill et al. | 343/113 R |
| 3,496,565 | 2/1970 | Jenkins | 364/559 |
| 3,697,997 | 10/1972 | Cooper | 343/113 R |
| 3,795,000 | 2/1974 | Bell et al. | 343/113 R |
| 3,872,477 | 3/1975 | King | 343/113 R |
| 3,980,948 | 9/1976 | Olive | 343/113 R |
| 4,094,073 | 6/1978 | Parra | 364/559 |

Primary Examiner—Felix D. Gruber
Attorney, Agent, or Firm—R. S. Sciascia; Philip Schneider

[57] ABSTRACT

A system for measuring, in conjunction with a GCA radar, the crab angle of an aircraft which is making its landing approach above a runway. A loop antenna mounted on the craft transmits an audio-frequency electromagnetic wave to two sets of crossed receiving loops, each set mounted at one side of the runway. A line joining the centers of the loops makes a 45° angle with the plane of each loop. The outputs of the loops in each set are subtracted from each other, amplified, detected and rectified and then differentiated to provide a pulse output indicating the zero point of the subtraction, i.e., the time when the H-field vector is at an angle of 45° to the plane of each of the loops in the set providing the zero-indicating pulse output. The zero-indicating pulse outputs are fed to a time interval counter which determines the time interval between them. With this information plus the ground speed of the craft (as determined by the GCA radar) and the distance between the receiving-loop sets, the crab angle of the aircraft can be calculated.

7 Claims, 3 Drawing Figures

ANGLE SENSING SYSTEM

BACKGROUND OF THE INVENTION

This invention relates to ground control approach (GCA) systems and especially to the determination of the crab angle of an aircraft which is flying over a landing strip just prior to touching down.

GCA landing systems employ radar to guide an aircraft to a point about 4 seconds from touchdown. At this point, the radar loses altitude information because the radar cannot resolve the aircraft from its image in the ground. The landing systems also lack information about aircraft orientation so they cannot properly flare or decrab the aircraft prior to touchdown and must limit landings to low crosswind conditions. A GCA system which is able to determine crab angle a few seconds before touchdown so that the aircraft could be informed how much to change course to come in straight along the runway would thus provide a distinct improvement over present GCA systems.

SUMMARY OF THE INVENTION

An object of this invention is to permit aircraft to decrab prior to touchdown when landing with crosswind in zero visibility conditions.

This invention comprises two sets of orthogonal receiving loops, each with associated electronic equipment for subtracting the loop outputs, detecting the resultant and differentiating the detected wave to provide a pulse when the receiving loop outputs are equal. The loops receive a signal radiated by a loop mounted on an aircraft which is coming in to land on a runway located between the sets of receiving loops. The pulse from a receiving-loop set denotes equal outputs from its loops. If the craft is landing without a crab angle, the pulses occur simultaneously; if there is a crab angle, there is a time interval between the occurrences of the pulses. This time interval is used to calculate the crab angle.

DETAILED DESCRIPTION OF THE INVENTION

Figure 1:
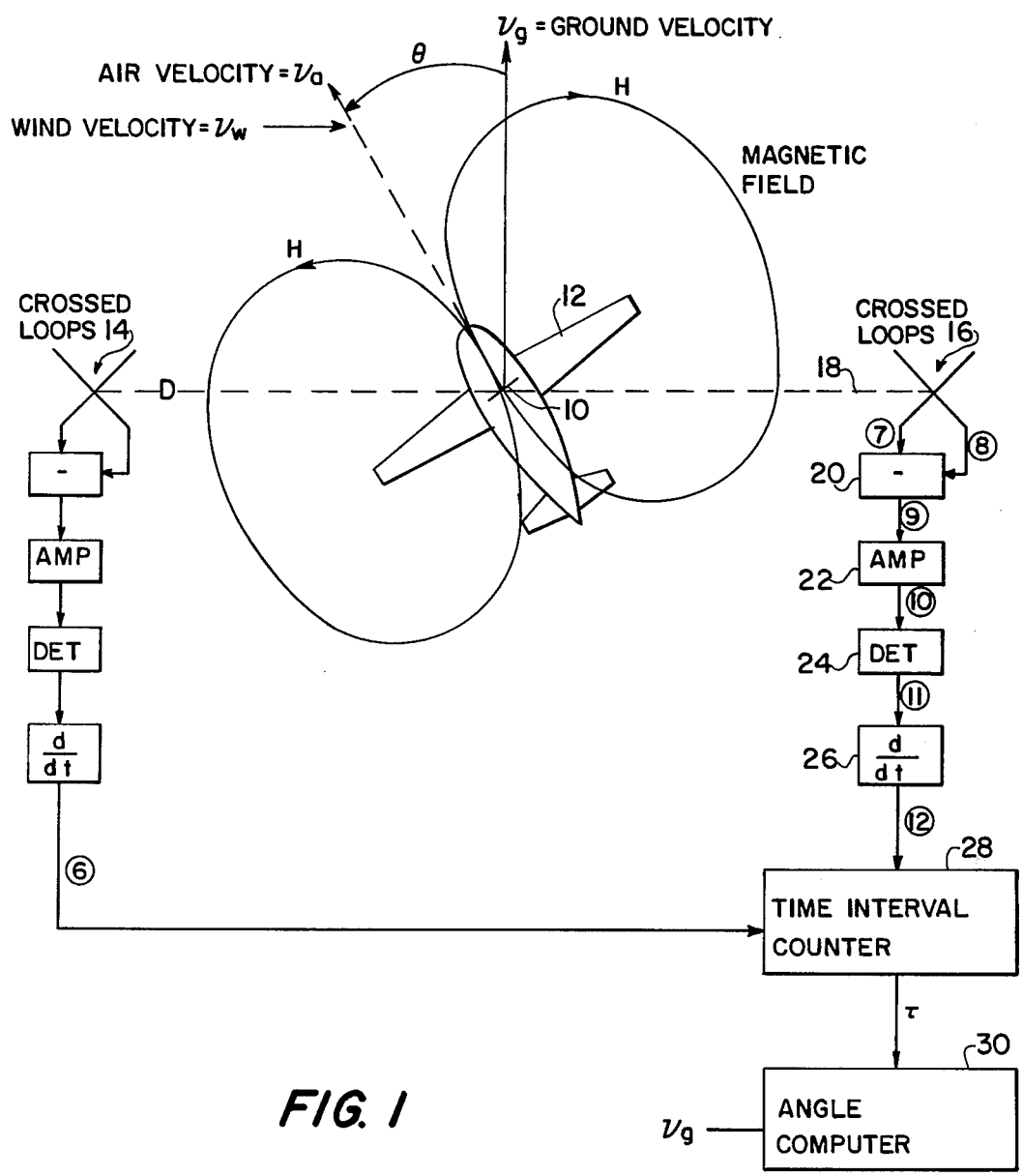
FIG. 1 is a schematic showing of an embodiment of the invention and the conditions of its use.

An embodiment of the invention is shown in FIG. 1 along with an indication of velocity factors and the magnetic field H radiated by the transmitting loop antenna 10 mounted on the aircraft 12. The invention senses the orientation of the audio-frequency, electrically driven loop by using two sets of crossed loops on the ground along the aircraft flight path, which is denoted by the line marked "$v_g$=ground velocity." The aircraft as shown is landing with a crab angle $\theta$ so that the vector addition of its air velocity, $v_a$, and the crosswind velocity, $v_w$, provides a ground velocity whose direction is substantially parallel to the direction of the runway.

The sets of crossed loops 14 and 16 are set up, one on each side of the runway, so that the distance between them, D, is equal to $X_1+X_2$, where $X_1$ is the lateral distance (see FIG. 2) from the center of the transmitting loop 10 on the aircraft to the Y-coordinate passing through the center of the crossed-loop set on the right-hand side of the runway and $X_2$ is the corresponding distance to the Y-coordinate of the crossed-loop set on the left-hand side of the runway. It is obvious, of course, that the aircraft flight path would be substantially normal (theoretically, it would be precisely normal) to the line 18 joining the centers of the sets of loops. The planes of the loops in each set are vertical and a line joining the centers of the two sets (e.g., line 18) makes a 45° angle with the plane of each loop in a set.

An audio-frequency electrical signal is fed to the transmitting loop 10 which radiates a magnetic field H. The crossed loops couple to the transmitting airborne loop when the magnetic field H has a component normal to the plane of the loops in the sets. When the H field makes the same angle with both loops in any set, both loops receive signals of equal strength (this would occur when the H-vector (see FIG. 2) makes a 45° angle with the plane of each loop, i.e., when the H-vector is parallel to the Y-coordinate line 50 through the center of the loop set 16, for example). For the crab angle shown in FIG. 1, loop set 16 will receive equal signals before the aircraft reaches the line 18 and set 14 will receive equal signals when the craft has passed line 18. If the craft has no crab angle but the lines $v_a$ and $v_g$ have the same direction (i.e., aircraft coming in straight along the runway), equal signals are received by each loop in each set when the transmitting loop 10 is directly in line with the line 18 between centers of the receiving loops.

Figure 2:
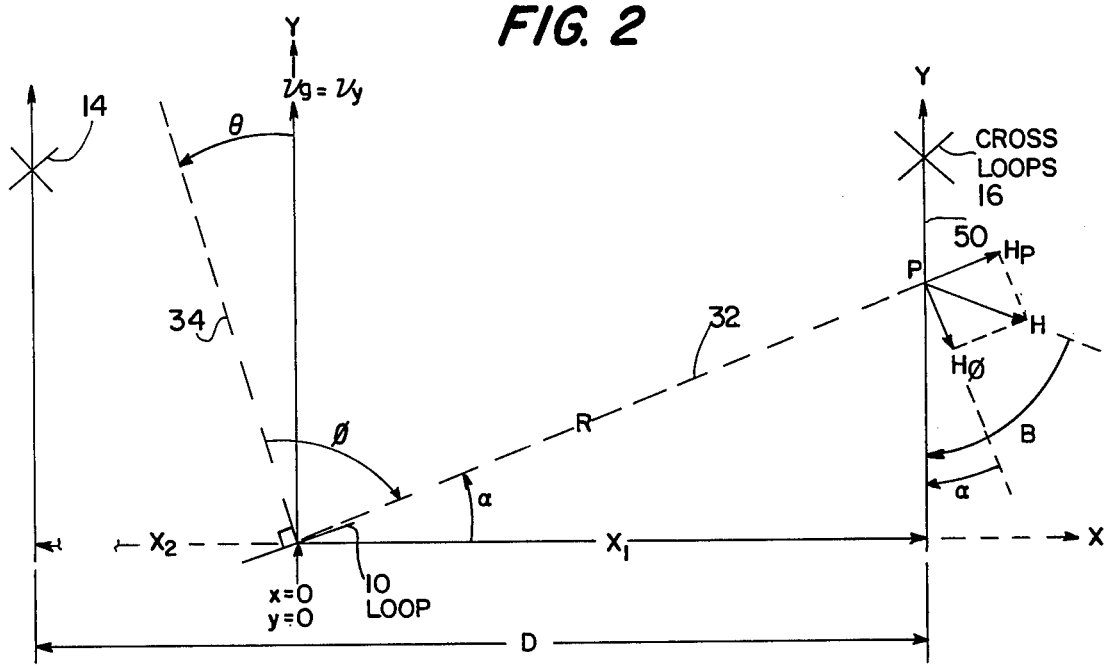
FIG. 2 is a diagram illustrating the magnetic field components of the radiated magnetic field of a loop at a point P in space and the geometry involved in this invention.

FIG. 2 shows the geometry and field components at a point P. The loop 10 on the aircraft is shown with a crab angle $\theta$. Rectangular coordinates, X and Y, are indicated, with the distance R being the radial distance from the center of the transmitting loop 10 to any given point P and the ground speed direction being aligned with Y axis. At point P, the vector H of the magnetic field is resolvable into two perpendicular components, $H_p$ in line with the direction of the radial distance line 32 and $H_\phi$ normal to the radial distance line 32. The angle $\phi$ is the angle between the line 34 (the air speed direction of the aircraft) and the radial distance line 32 of the point P.

Returning now to FIG. 1, the outputs of the two loops in a set are subtracted from each other, the difference is amplified and detected, and the detected signal is differentiated with respect to time. The output of the differentiator is a pulse when the difference signal goes to zero. The pulses from the two channels are fed to a time interval counter 28 and the count is fed to a computer 10 which computes the crab angle. The crab angle correction can then be radioed back to the aircraft, either to the pilot or to automatic correction equipment.

Figure 3:
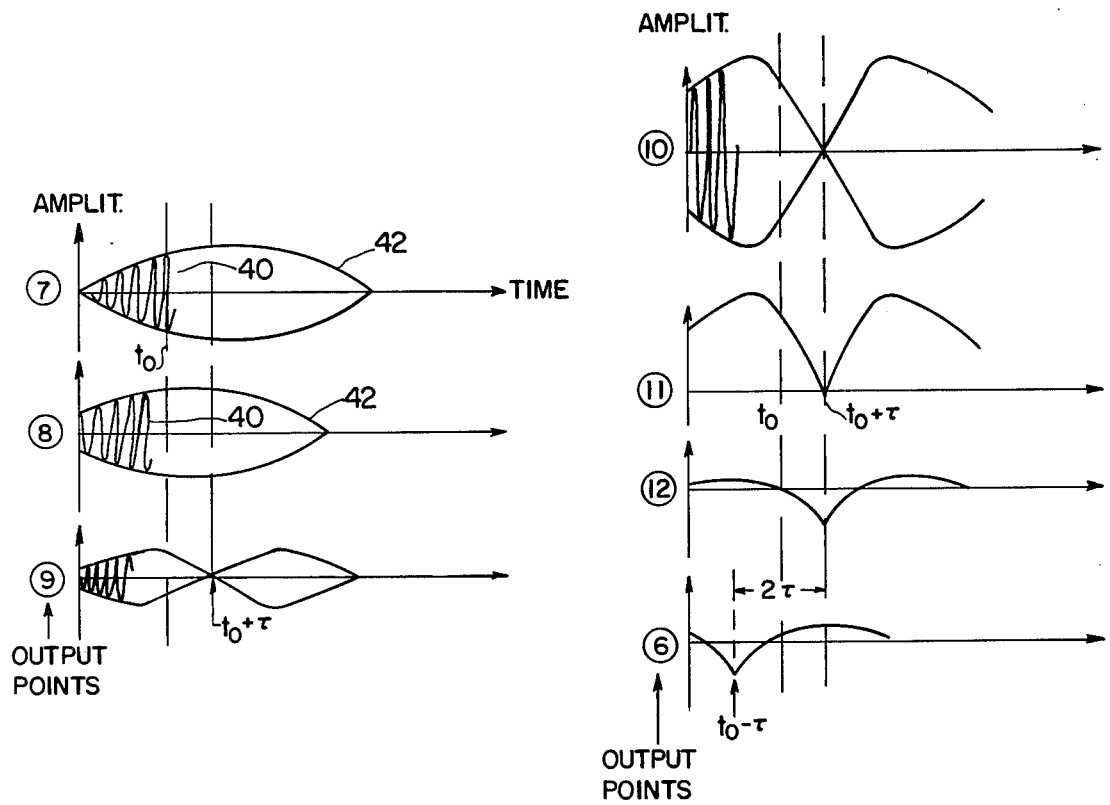
FIG. 3 is a set of output waveforms which occur at designated points in the circuit.

The output signals at the designated output points for the right-hand channel are shown in FIG. 3. The output of one coil appears at point (7) and that of the other coil at point (8). Zero time, $t_o$, is the time when the center of the transmitting coil 10 on the aircraft crosses the line of centers 18 between the sensor, or receiving coils. The output of a receiving coil is a sine wave modulated by the aircraft motion past the coil; the sine wave may be a 3-7KC audio wave 42, for example. As may be seen, the output amplitude of one coil (here the output at point (8) maximizes before the output of the other, except for the one case where there is no crab angle and the transmitting loop is passing through the line of centers of the receiving loops). At a point, $t_o + \tau$, between maxima, the amplitudes are equal. When the two coil outputs are subtracted, a zero amplitude results. The output of the subtraction circuit 20 is shown at (9). This subtracted wave is then amplified, the result being shown as output (10) and then detected.

The detector 24 removes the audio wave 40 and rectifies the remaining wave, leaving only half of the envelope, as shown in waveform (11). The output of the detector is differentiated to provide a spike, or pulse, output (12). The output (6) of the differentiator of the left-hand channel is also shown to indicate the time at which it occurs. There is a time difference, $2\tau$, between the occurrences of the zero points of the pulse corresponding to the value of the crab angle $\theta$.

The theory of operation is as follows: The loop 10 On the aircraft is driven with a current $$I = I_o \cos wt \qquad (1)$$

where $I_o$ is the peak current, w is the angular frequency of the signal (in the audio range) and t is time. This will produce a magnetic amount $$M = NIA \qquad (2)$$

where N is the number of turns in the loop and A is the area enclosed by each turn.

FIG. 2 defines the magnetic field H at an arbitrary point P, described by the point's radial distance R from the center of the loop 10 and the angle $\theta$ with a line 32 from the point at the center of the loop makes to the point P with the loop axis 34. H is the vector sum of the radial component $H_p$ of the magnetic field and the $\phi$ component $H_\phi$ defined by $$H_p = \frac{2 M \cos \phi}{R^3} \qquad (3)$$

and $$H_\phi = \frac{M \sin \phi}{R^3} \qquad (4)$$

Equation 3 and 4 can be used with FIG. 3 to determine the relationship between crab angle $\theta$ and zeros (pulses out of crossed-loop sets).

FIG. 2 also portrays the airborne loop moving along its ground path with a velocity $v_g$ in the Y direction and with a crab angle $\theta$. The Y direction is the direction of the runway on which the aircraft is about to land. The H field along a line parallel to $v_g$ through the centers of a crossed-loop set can be calculated as a function of position in Y with respect to the Y=0 position of the airborne loop. The Y position where the H field is parallel to the Y axis, i.e., makes the same angle with both loops on the set, can then be found. The effect of $\theta$ on the time of occurrence of a zero out of the crossed loops can be defined as follows:

From geometry, $$\phi = 90° + \theta - \alpha \qquad (5)$$

From equations 3 and 4

$$H_p = \frac{2M \cos \phi}{(X_1/\cos \alpha)^3} \qquad (6)$$

and $$H_\phi = \frac{M \sin \phi}{(X_1/\cos \alpha)^3} \qquad (7)$$

The angle H makes with Y can be found to be:

$$B = \arctan \left( \frac{H_p}{H_\phi} \right) + \alpha \qquad (8)$$

From (6) and (7) in (8)

$$B = \arctan \frac{2 \cos \phi}{\sin \phi} + \alpha \qquad (9)$$

From (5) in (9) remembering that $\cos(90+x) = -\sin x$ and $\sin(90+x) = \cos x$ $$B = \arctan \left[ \frac{-2 \sin(\theta - \alpha)}{\cos(\theta - \alpha)} \right] + \alpha \qquad (10)$$

When $$\theta - \alpha < 0.25 \text{ radians} \qquad (11)$$

$$B \approx -2(\theta - \alpha) + \alpha \qquad (12)$$

When $$B = 0 \text{ (H parallel to Y)} \qquad (13)$$

$$2\theta - 2\alpha = \alpha \qquad (14)$$

or $$\alpha = 2\theta/3 \qquad (15)$$

Thus, the Y position of B=0 is:

$$Y_{B=0.1} = X_1 \tan \alpha \approx \frac{2 X_1 \theta}{3} \qquad (16)$$

By symmetry, $Y_{B=0}$ at the crossed loops on the other side of the aircraft will be:

$$Y_{B=0.2} = \frac{-2 X_2}{3} \qquad (17)$$

where $X_2$ is the distance from the center of loop 10 to the $-Y$ coordinate of the left-hand set of loops 14.

The aircraft flight time between zeros on opposite sets of crossed loops will then be:

$$2 \tau = \frac{|Y_{B=0.1}| + |Y_{B=0.2}|}{v_g} = \frac{\frac{2\theta}{3}(X_1 + X_2)}{v_g} = T \qquad (18)$$

or $$\theta = \frac{3 v_g (2\tau)}{2 D} = \frac{3 v_g T}{2 D} \qquad (19)$$

where D is the line-of-centers distance between the two sets of receiving loops. T is measured by the time interval counters 28. Equation 19 illustrates the principle of this invention and permits crab angle to be measured in terms of the time difference between the outputs of the ground-mounted crossed-coil sets on opposite sides of the runway.

The time T and the velocity $v_g$ can be fed into computation means such as an angle computer 30 which provides the value of the crab angle $\theta$. This value can be transmitted to the aircraft so that a correction of heading can be made.

The transmitting coil 10 can be mounted with its plane in the fore-and aft direction of the aircraft. This merely changes the constant of proportionality between $\theta$ and T in the final equation.

Roll and pitch can also be measured with orthogonal sets of coils on the aircraft operating at different audio frequencies and properly tuned orthogonal ground-coil sets.

Obviously many modifications and variations of the present invention are possible in light of the above teachings. It is therefore to be understood that within the scope of the appended claims the invention may be practiced otherwise than specifically described.

I claim:

1. Apparatus for generating a pair of signals having a time interval, T, between them which is a function of the crab angle, $\theta$, of an aircraft which is coming in for a landing along a runway, said apparatus being used in conjunction with a loop antenna on the aircraft which is radiating an electro-magnetic audio-frequency sine wave, said apparatus comprising:
   a pair of magnetic-field interaction means, each located on a different side of said runway and each providing a pair of output signals in response to the magnetic field of the wave radiated from the aircraft,
   each said interaction means comprising means for producing a set of orthogonal signals from the wave radiated from the aircraft, and means for generating a difference signal from said orthogonal signals; and
   means for producing a signal corresponding to the time difference between the difference signals generated from said orthogonal signals.

2. Apparatus as in claim 1, wherein each said means for producing a set of orthogonal signals comprises:
   a set of two crossed loops for receiving electro-magnetic waves, each loop being mounted vertically and making an angle of 45° with a line of centers between the intersection point of the sets of loops, the line of centers being normal to the direction of the runway.

3. Apparatus as in claim 2, wherein each said means for generating a difference signal comprises means for subtracting the output of one loop from that of the other loop in its associated set.

4. Apparatus as in claim 3, wherein each said interaction means further includes:
   means for detecting and rectifying the output of said means for generating a difference signal to provide an envelope signal which has a zero value when the outputs of said loops are equal in magnitude, and means for differentiating the envelope signal to provide a sharp signal having its maximum absolute value when the envelope signal has its zero value, the time interval, T, between the sharp output of each differentiating means being a function of the crab angle, $\theta$, of the aircraft.

5. Apparatus as in claim 2, further including:
   angle-computing means, to which the time interval signal, T, and the ground speed signal, $v_g$, are fed, for computing the crab angle, $\theta$, in accordance with the equation $$\theta = (3/2D)v_g T$$

where D is the distance between the intersection points of the two sets of loops along the line of centers.

6. Apparatus for determining the time interval, T, between a pair of signals which have a time interval between them which is a function of the crab angle, $\theta$, of an aircraft which is coming in along a runway for a landing thereon, said apparatus being used in conjunction with a loop antenna on the aircraft, which loop antenna is radiating an electromagnetic audio-frequency sine wave, said apparatus comprising:
   a pair of magnetic-field interaction means, each located on a different side of the runway and each comprising,
      a set of two crossed loops, each being mounted vertically and making an angle of 45° with a line of centers between the intersection points of the sets of loops, the line of centers being normal to the direction of the runway,
   subtracting means for generating a difference signal from the outputs of the two crossed loops,
   means for detecting and rectifying the output of the subtraction means to provide an envelope signal which has a zero value when the outputs of said loops are equal in magnitude,
   means for differentiating the envelope signal to provide a sharp signal having its maximum absolute value when the envelope signal has its zero value, the time interval, T, between the sharp output of each differentiating means being a function of the crab angle, $\theta$, of the aircraft; and
   time-interval-determining means, to which the outputs of said differentiating means are fed, for measuring the time interval, T.

7. Apparatus for determining the crab angle, $\theta$ of an aircraft which is coming in along a runway for a landing thereon and which is carrying a loop antenna which is radiating an electromagnetic audio-frequency sine wave, said apparatus being used in conjunction with means for determining the ground speed, $v_g$, of the aircraft and providing an output signal proportional thereto, said apparatus comprising:
   a pair of magnetic-field interaction means, each located on a different side of the runway and each comprising:
      a set of two crossed loops, each being mounted vertically and making an angle of 45° with a line of centers between the intersection points of the sets of loops, the line of centers being normal to the direction of the runway,
   subtracting means for generating a difference signal from the outputs of the two crossed loops,
   means for detecting and rectifying the output of the subtraction means to provide an envelope signal which has a zero value when the outputs of said loops are equal in magnitude,
   means for differentiating the envelope signal to provide a sharp signal having its maximum absolute value when the envelope signal has its zero value, the time interval, T, between the sharp output of each differentiating means being a function of the crab angle, $\theta$, of the aircraft;
   time-interval-determining means, to which the outputs of said differentiating means are fed, for measuring the time interval, T, and providing an output signal in proportion thereto; and angle-computing means, to which the time interval signal, T, and the ground speed signal, $v_g$, are fed, for computing the crab angle, $\theta$, in accordance with the equation $$\theta = (3/2D)v_g T$$

where D is the distance between the intersection points of the two sets of loops along the line of centers.

* * * * *